United States Patent
Bazot et al.

(10) Patent No.: US 12,372,001 B2
(45) Date of Patent: Jul. 29, 2025

(54) SECONDARY FLOW GUIDE VANE OF A TURBOMACHINE AND TURBOMACHINE PROVIDED THEREWITH

(71) Applicant: SAFRAN AIRCRAFT ENGINES, Paris (FR)

(72) Inventors: Olivier Bazot, Moissy-Cramayel (FR); Vincent Joudon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/730,612

(22) PCT Filed: Jan. 18, 2023

(86) PCT No.: PCT/FR2023/050071
§ 371 (c)(1),
(2) Date: Jul. 19, 2024

(87) PCT Pub. No.: WO2023/139332
PCT Pub. Date: Jul. 27, 2023

(65) Prior Publication Data
US 2025/0137380 A1    May 1, 2025

(30) Foreign Application Priority Data
Jan. 21, 2022  (FR) .................................. FR2200502

(51) Int. Cl.
*F01D 9/04*     (2006.01)
*B64D 27/10*    (2006.01)
(Continued)

(52) U.S. Cl.
CPC ............. *F01D 9/041* (2013.01); *B64D 27/10* (2013.01); *F01D 17/162* (2013.01); *F03B 3/126* (2013.01);
(Continued)

(58) Field of Classification Search
CPC ........ F01D 9/041; F01D 17/162; F03B 3/126; F04D 29/30; F04D 29/305; F04D 29/563; B64D 27/10; F05D 2220/323
See application file for complete search history.

(56) References Cited

U.S. PATENT DOCUMENTS 1,360,596 A * 11/1920 St John .................. B64C 11/20
                                                        29/889.6
2,690,810 A * 10/1954 Doussain ................ B64C 11/04
                                                        52/836
(Continued)

FOREIGN PATENT DOCUMENTS

FR         2103278 A5     4/1972
FR         2106330 A5     4/1972
(Continued)

OTHER PUBLICATIONS

International Search Report, issued in PCT/FR2023/050071, PCT/ISA/210, dated Mar. 13, 2023.

*Primary Examiner* — Brian Christopher Delrue
(74) *Attorney, Agent, or Firm* — Birch, Stewart, Kolasch & Birch, LLP (57) ABSTRACT

The invention relates to a secondary flow stator vane (1) for a turbomachine, comprising skins (2, 3) having end portions (21, 31) delimiting an opening (5) and a cavity (4) therebetween, which skins diverge from one another in a direction (Y). A filler material (41) is located in the cavity (4) at a distance from the opening (5). A reinforcement (6), the density of which is higher than the density of the material (41), comprises a first reinforcement portion (61) located in the cavity (4) against the material (41) and a second reinforcement portion (62) for closing the opening (5) between the portions (21, 31) to form a single piece.

15 Claims, 6 Drawing Sheets

(51) Int. Cl.
*F01D 17/16* (2006.01)
*F03B 3/12* (2006.01)
*F04D 29/30* (2006.01)
*F04D 29/56* (2006.01)

(52) U.S. Cl.
CPC ........... *F04D 29/30* (2013.01); *F04D 29/305* (2013.01); *F04D 29/563* (2013.01); *F05D 2220/323* (2013.01); *F05D 2240/12* (2013.01); *F05D 2300/603* (2013.01)

(56) References Cited

U.S. PATENT DOCUMENTS

| | | | | |
|---|---|---|---|---|
| 2,920,868 | A | * | 1/1960 | Ackerman .............. F01D 5/282 89/1.15 |
| 2,929,755 | A | * | 3/1960 | Porter .................. F01D 5/3007 416/241 A |
| 3,743,816 | A | | 7/1973 | Sato |
| 4,514,141 | A | * | 4/1985 | Marey .................. F01D 17/162 415/160 |
| 4,604,030 | A | * | 8/1986 | Naudet ................. F01D 11/001 415/126 |
| 4,810,167 | A | * | 3/1989 | Spoltman .................. B32B 3/18 416/241 A |
| 4,884,948 | A | * | 12/1989 | Sikorski .................. B64C 11/26 416/240 |
| 5,458,465 | A | * | 10/1995 | von Wieser ............. F04D 29/38 416/214 R |
| 5,796,199 | A | * | 8/1998 | Charbonnel .......... F01D 17/162 310/90 |
| 6,129,512 | A | * | 10/2000 | Agram .................. F01D 17/162 415/229 |
| 6,139,278 | A | | 10/2000 | Mowbray et al. |
| 6,176,681 | B1 | * | 1/2001 | Stromberg ............ F04D 29/388 416/239 |
| 11,384,649 | B1 | * | 7/2022 | Rambo ..................... F01D 9/02 |
| 2001/0016091 | A1 | * | 8/2001 | Mesing ................. F04D 29/023 384/300 |
| 2004/0081554 | A1 | * | 4/2004 | Bruce .................. F04D 29/057 415/229 |
| 2009/0274547 | A1 | * | 11/2009 | Jahns .................... F04D 23/006 415/60 |
| 2014/0119895 | A1 | * | 5/2014 | Lockyer ................ F04D 29/563 415/208.1 |
| 2015/0017000 | A1 | * | 1/2015 | Sato ....................... F16C 17/10 416/174 |
| 2016/0298457 | A1 | * | 10/2016 | Edwards ................... F01D 5/10 |
| 2018/0127084 | A1 | * | 5/2018 | Tajan ...................... F01D 7/00 |
| 2019/0323357 | A1 | * | 10/2019 | Courtier .................. B64C 11/30 |
| 2020/0003061 | A1 | * | 1/2020 | Lanfant ................. F01D 9/041 |
| 2020/0123905 | A1 | | 4/2020 | Husband et al. |
| 2021/0108597 | A1 | * | 4/2021 | Ostdiek ................... F02K 3/077 |
| 2023/0079110 | A1 | * | 3/2023 | Lima ...................... B64C 11/32 415/121.3 |
| 2023/0081843 | A1 | | 3/2023 | Courtier et al. |
| 2023/0093651 | A1 | | 3/2023 | Dambrine et al. |
| 2023/0271695 | A1 | * | 8/2023 | Charier ................. F01D 17/162 244/69 |
| 2023/0358149 | A1 | * | 11/2023 | Levisse ................ F01D 17/162 |
| 2023/0366325 | A1 | * | 11/2023 | Levisse ................. F01D 9/042 |
| 2024/0151153 | A1 | * | 5/2024 | Guiot .................... F04D 29/563 |

FOREIGN PATENT DOCUMENTS

| | | | | |
|---|---|---|---|---|
| FR | 3063514 | A1 | 9/2018 | |
| FR | 3080322 | A1 | 10/2019 | |
| FR | 3082230 | A1 * | 12/2019 | ............ B64C 11/32 |
| FR | 3106519 | A1 | 7/2021 | |
| FR | 3107300 | A1 | 8/2021 | |
| GB | 190619303 | A * | 8/1907 | |
| GB | 1291562 | A * | 10/1972 | ............ B64C 11/26 |
| WO | WO 2012/001279 | A1 | 1/2012 | |

* cited by examiner

SECONDARY FLOW GUIDE VANE OF A TURBOMACHINE AND TURBOMACHINE PROVIDED THEREWITH

The invention relates to a secondary flow guide vane of a turbomachine, and a turbomachine provided therewith.

The field of the invention relates to aircraft turbomachines, in particular turbojet engines or turbo-propeller engines.

The increase in the bypass ratio (ratio of the flow rate of the primary flow to the flow rate of the secondary flow) is the solution preferred by engine manufacturers to improve the performances of aeronautical turbomachine engines and to reduce their specific fuel consumption. This manifests as an increase in the diameter of the vanes for a given engine thrust, in particular the first inlet vane (fan or propeller vane) and the associated guide vanes, which are located downstream of this first inlet vane. This increase in dimensions is even greater for architectures with no fairing.

The increase in these dimensions does however have the drawback of leading to an increase in the mass of the guide vanes, which has an adverse effect on the performance of the engine.

There is known from the document FR-A-3 063 514 secondary flow guide vane of a turbomachine with fairing, which comprises a vane body made of composite material composed of a fiber reinforcement with three-dimensional weaving and densified with a matrix. This fiber reinforcement has in a longitudinal direction a first part extended by a second end part, the second part comprising two segments separated from each other from the junction between the first and the second part to a free end of the fiber reinforcement. The vane further comprises an insert having a pi-shaped section, the insert comprising a platform part extending perpendicularly with respect to the longitudinal direction, and two longitudinal flanges separated from one another by a space, the platform part comprising a housing delimited by a bottom wall and a rim, the bottom wall comprising an opening communicating with the space between the two flanges. The first part of the fiber reinforcement of the vane body is clamped between the two flanges of the insert, the segments of the second part of the fiber reinforcement being folded on either side of the first part against the bottom wall of the housing of the insert. The vane further comprises an insert between the segments of the second part of the fiber reinforcement at the junction between said segments. The turbomachine is faired, by the fact that the guide vanes extend radially between an internal platform, via which the guide vane is attached to an inner casing of the turbojet engine, and two outer platforms allowing the attachment of the guide vane to an outer casing of the turbojet engine.

The guide vane known from the document FR-A-3 063 514 does indeed make it possible to limit the increase in mass and to manufacture the vanes out of a solid composite material instead and in place of metallic materials, for example for hollow titanium vanes or aluminum vanes.

However, given the greater dimensions of the guide vanes in a turbomachine architecture with no fairing, it is necessary to improve this mass reduction.

However, in architectures with no fairing, the fact of attaching the guide vane by a single one of its radial ends (vane root) to a casing of the turbomachine has the consequence of making all the forces pass through the root area, which results in high levels of stress in the composite parts of the guide vane.

An objective of the invention is to obtain a secondary flow guide vane of a turbomachine, and a turbomachine equipped therewith, which solves the problem mentioned above by making it possible to reduce the stresses while also limiting the increase in mass.

For this purpose, a first subject matter of the invention is a secondary flow guide vane of a turbomachine, comprising a first outer skin and a second outer skin, which are made of a first composite material and which are connected to one another, the first outer skin comprising a first end part, the second outer skin comprising a second end part distant from the first end part,
the first end part and the second end part being located on the same mounting side of the vane, delimiting between them an opening nd branching away from one another along a thickness direction, characterized in that the vane further comprises:

a cavity, which is located along the thickness direction between the first outer skin and the second outer skin and which opens into the opening,
a filling material which has a first density and which is located in the cavity and at a distance from the opening,
a reinforcement, which has a second density greater than the first density and which comprises a first reinforcing part located in the cavity and against the filling material and a second reinforcing part, which closes the opening between the first end part and the second end part,
the first reinforcing part forming a single piece with the second reinforcing part.

The solution proposed here makes it possible both to improve the mechanical strength in the root area (end parts of the mounting side) of the guide vane in a turbomachine architecture with no fairing, while limiting the mass increase. The invention makes it possible to stiffen the root of the guide vane, which reduces the stresses while limiting the impact on the mass.

The benefits of such a solution are as follows:

Decrease in the stresses in the composite skins at the connection radii;
Reduction in the displacements of the skins at the root area but also at the vane tip;
Increase in the frequency of the first resonance mode.

The known vanes having a cavity between two skins also have the following problems: high stresses in the composite skins have been observed at the vane root; in addition, displacements of the skins in this area are too great; this limits the lifetime of the vane, prevents proper frequency location of the vane (in particular the first resonance mode) and generates a risk of buckling of the composite skins. The invention makes it possible to solve these problems posed by known vanes having a cavity between two skins, by dispensing with a spar of significant mass inserted into the cavity.

The invention makes it possible to significantly reduce stresses at the root of the guide vane at the connection radius.

According to an embodiment of the invention, the first reinforcing part comprises a contact surface for contact with the filling material in the cavity, the first outer skin and the second outer skin having a leading edge and a trailing edge, distant from one another along a width direction of the vane, which is transverse with respect to the thickness direction,
the mounting side of the vane being located under an airflow line along a height direction of the vane, transverse with respect to the thickness direction and with respect to the width direction, the airflow line forming a limit of the secondary flow of the turbomachine on the first outer skin and on the second outer skin, a first upstream part of the contact surface, which is located on the side of the leading edge, is located along the height direction above a second upstream part of the airflow line, which is located on the side of the leading edge.

According to an embodiment of the invention, a first downstream part of the contact surface, which is located on the side of the trailing edge, is located along the height direction below a second downstream part of the airflow line, which is located on the side of the trailing edge.

According to an embodiment of the invention, the first upstream part of the contact surface is located along the height direction at a height greater than or equal to 50 mm and less than or equal to 100 mm above the opening.

According to an embodiment of the invention, the first upstream part of the contact surface is located along the height direction at a height greater than or equal to 50 mm and less than or equal to 100 mm above the second upstream part of the airflow line.

According to an embodiment of the invention, a plate makes a connection between the first end part and the second end part, is attached under and against the first end part and the second end part and is located against the opening and against the second reinforcing part.

According to an embodiment of the invention, the second reinforcing part extends as a base of non-zero height under the first end part, under the second end part and under the opening.

According to an embodiment of the invention, a plate is attached under and against the base.

According to an embodiment of the invention, the plate is made of a composite material.

According to an embodiment of the invention, the reinforcement is made of the first composite material.

According to an embodiment of the invention, the reinforcement is made of a second non-woven composite material with fibers embedded in a matrix.

According to an embodiment of the invention, the reinforcement is made of at least one metal.

According to an embodiment of the invention, the reinforcement has a Young modulus greater than or equal to 5 GPa. According to an embodiment of the invention, the reinforcement has a Young modulus for example in the order of 10 to 20 GPa.

According to an embodiment of the invention, the filling material comprises at the contact surface a protruding part, which fits into a hollow part of the first reinforcing part.

A second subject matter of the invention is an aeronautical turbomachine with no fairing, comprising:
a casing,
a fan having a fan hub and peripheral fan blades, secured to the fan hub,
the fan hub having a downstream hub part, which is surrounded by an inner surface of an upstream part of the casing and which protrudes from the upstream part of the casing,
the fan hub being mounted rotatably with respect to the upstream part of the casing about an axis of rotation, directed from upstream to downstream,
the turbomachine further comprising secondary flow guide vanes as described above, which are located, by their mounting side, adjacent to an outer wall of the upstream part of the casing and are located downstream with respect to the peripheral fan blades. According to an embodiment of the invention, the guide vanes can for example have variable settings, just like the peripheral fan blades.

The invention will be better understood on reading the following description, given solely by way of non-limiting example with reference to the figures below of the appended drawings.

Below is a more detailed description with reference to FIG. 12 of an example of a turbomachine 100 on which can be used the secondary flow guide vane(s) 1 according to the invention.

Figure 12:
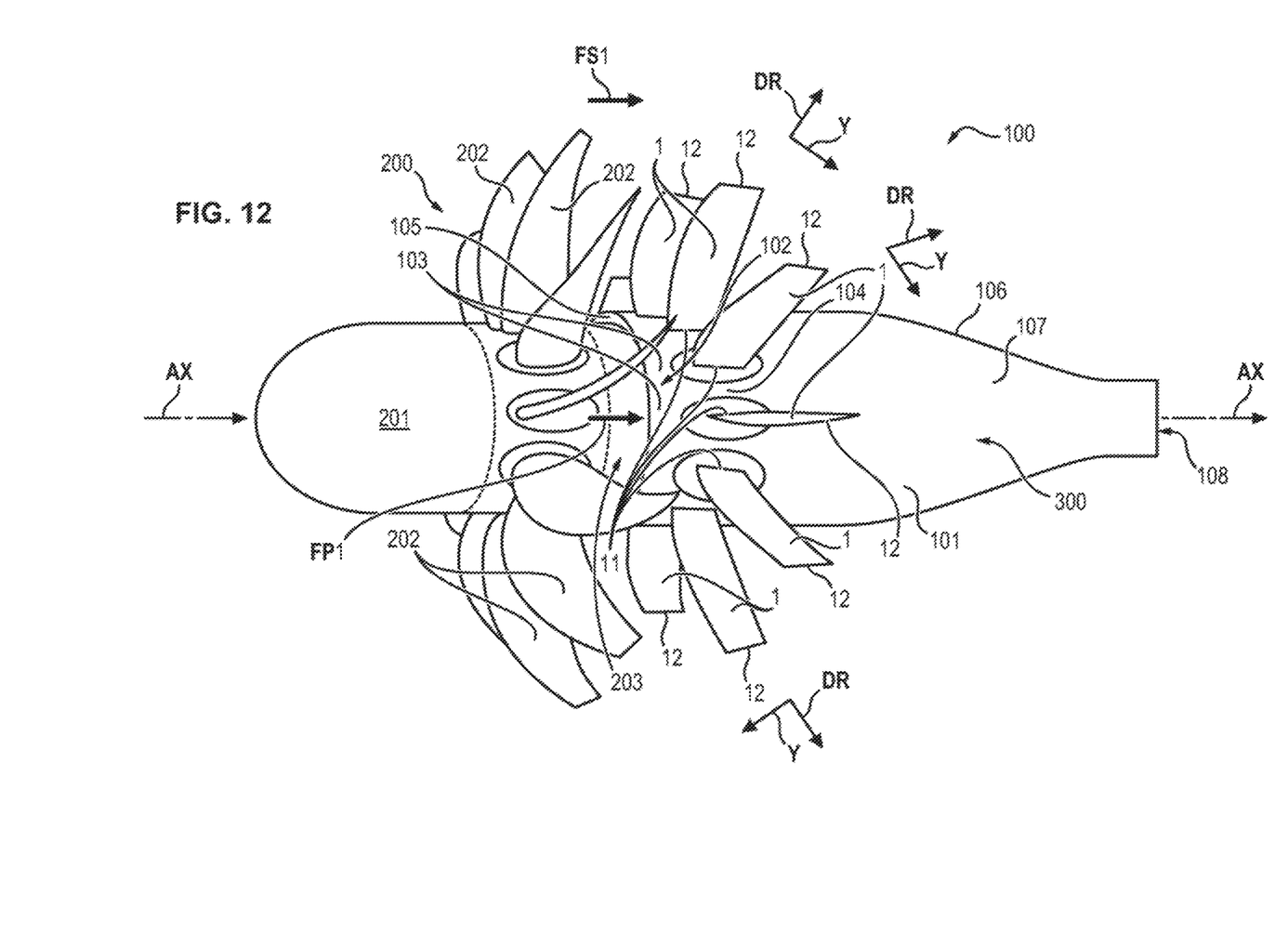
FIG. 12 shows a schematic perspective view of an example of a turbomachine with no fairing, comprising guide vanes according to the invention.

As is known, the turbomachine 100 shown in FIG. 12 is intended to be installed on an aircraft, not shown, to propel it through the air, which can for example be an airplane or a helicopter.

The gas turbine engine or turbomachine 100 assembly is of type with no fairing.

The gas turbine engine or turbomachine 100 assembly extends about an axis AX or axial direction AX oriented from upstream to downstream. Consequently, the terms "upstream" and "downstream", "front" and "back" and "left" and "right" respectively are taken along the general direction of the gas which flows through the turbomachine along the axis AX. The direction going from the inside to the outside is the radial direction DR (or height direction DR mentioned below, or span direction DR mentioned below) starting from the axis AX.

The turbomachine 100 comprises a casing 101 bearing on its upstream side a fan 200 having a fan hub 201 and peripheral fan blades 202, secured to the fan hub 201 and distributed over it about the axis AX of rotation upstream of the casing 101. The fan hub 201 has a downstream hub part 203, which is surrounded by an inner surface 102 of an upstream part 103 of the casing 101 and which projects past the upstream part 103 of the casing 101. The fan hub 201 is able to turn about itself with respect to the upstream part 103 of the casing 101 about the axis AX of rotation. The turbomachine comprises downstream of the fan hub 201 and in the casing 101 an engine assembly 300 allowing the fan hub 201 and therefore the peripheral fan blades 202 to rotate about the axis AX of rotation.

The turbomachine 100 further comprises secondary flow guide vanes 1, the mounting side 11 of which is mounted removably or attached to an outer wall 104 of the upstream part 103 of the casing 101. The mounting side 11 is adjacent to the outer wall 104 of the upstream part 103 of the casing 101. The secondary flow guide vanes 1 are located downstream with respect to the peripheral fan blades 202. The guide vanes 1 are therefore placed in the secondary air flow FS1, which is created downstream of the peripheral fan blades 202 around the outer wall 104 of the casing 101, when the peripheral fan blades 202 are set to rotate about the axis AX.

The aeronautical turbomachine 100 is without fairing, which means that the guide vane 1 is attached or mounted solely by its mounting side 11 (or vane root) on the outer wall 104 of the upstream part 103 of the casing 101. The vane tip 12, which is located at the end of the vane 11 more distant from its mounting side 11 along the radial direction DR, is left bare in the secondary air flow, without being mounted, or attached to a casing, no casing or nacelle surrounding the guide vanes 1 and the casing 101.

The engine assembly 300 comprises in the casing 101, from upstream to downstream in the direction of flow of the gas, a low-pressure compressor, a high-pressure compressor, a combustion chamber, a high-pressure turbine and a low-pressure turbine, which delimit a primary flow of gas through the casing 101 from an air inlet 105, which is located between the upstream part 103 of the casing 101 and the fan hub 201 and downstream of the peripheral fan blades 202.

The low-pressure compressor and the high-pressure compressor can each comprise one or more stages, each stage being formed by a set of fixed vanes (or stator vanes) and a set of rotary blades (or rotor blades). The fixed vanes of the low-pressure compressor are attached to the casing 101. The rotary blades of the low-pressure compressor are attached to a first rotary transmission shaft extending along the axis AX. The fixed vanes of the high-pressure compressor are attached to the casing 101. The rotary blades of the high-pressure compressor are attached to a second rotary transmission shaft extending along the axis AX. The high-pressure turbine and the low-pressure turbine can each comprise one or more stages, each stage being formed by a set of fixed vanes (or stator vanes) and a set of rotary blades (or rotor blades). The fixed vanes of the high-pressure turbine are attached to the casing 101. The rotary blades of the high-pressure turbine are attached to the second rotary transmission shaft. The fixed vanes of the low-pressure turbine are attached to the casing 101. The rotary blades of the low-pressure turbine attached to the first rotary transmission shaft.

The rotary blades of the low-pressure turbine drive the rotary blades of the low-pressure compressor to rotate about the axis AX under the effect of the thrust of the gas coming from the combustion chamber. The rotary blades of the high-pressure turbine drive the rotary blades of the high-pressure compressor to rotate about the axis under the effect of the thrust of the gas coming from the combustion chamber.

In operation, the air flows through the rotary fan 200 and a first part FP1 (primary flow FP1) of the air flow is routed through the low-pressure compressor and the high-pressure compressor, in which the primary flow FP1 is compressed and sent to the combustion chamber. The hot combustion products coming from the combustion chamber are used to drive the high-pressure turbine and the low-pressure turbine and thus produce the thrust of the turbomachine 100, and are expelled by a nozzle 108 located at the downstream end of the downstream part 107 of the casing 101, located downstream of the upstream part 103 of the casing 101. The secondary air flow FS1 is expelled from the rotary fan 200 around the casing 101 from upstream to downstream. The guide vane 1 has a shape configured to concentrate the secondary air flow FS1 against the outer surface 106 of the downstream part 107 of the casing 101, located downstream of the outer wall 104 of the upstream part 103 of the casing 101. An outer attaching arm or an outer attaching means connects the casing 101 to an aircraft.

Below the secondary flow guide vane 1 of a turbomachine according to the invention is described with reference to FIGS. 1 to 9.

The secondary flow guide vane 1 of a turbomachine comprises a first outer skin 2 and a second outer skin 3, which are made of a first composite material and which are connected to one another. These skins 2 and 3 form the outer surface of the guide vane 1, located in the secondary air flow FS1 during the operation of the turbomachine, when it is in operation, as described above. The first outer skin 2 and the second outer skin 3 bear the leading edge 8 of the guide vane 1, which has its edge located the most upstream along the width direction of the vane 1, formed by the axial direction AX. The first outer skin 2 and the second outer skin 3 bear the trailing edge 9 of the guide vane 1, which has its edge located the most downstream along the width direction AX (or cord direction AX) of the vane 1.

In the area of the vane root 11 or mounting side 11 of the guide vane 1, the first outer skin 2 comprises a first end part 21, and the second outer skin 3 comprises a second end part 31 distant from the first end part 21 along the thickness direction Y. The first end part 21 and the second end part 31 together delimit an opening 5 and move away from one another along the thickness direction Y, as shown by way of example in FIGS. 2 to 6. The thickness direction Y is perpendicular to the width direction AX and to the height direction DR. The height direction DR is perpendicular to the width direction AX. The first outer skin 2 and the second outer skin 3 together delimit along the thickness direction Y a cavity 4. The cavity 4 is located above the opening 5 and above the first and second end part 21, 31 along the height direction DR and opens into the opening 5. A filling material 41 (or filling part 41) is located in the cavity 4 against the skins 2 and 3 and at a distance from the opening 5.

A first part 61 of a reinforcement 6 is located against the filling material 41 in the cavity 4. The first reinforcing part 61 comprises a contact surface 610 for contact with the filling material 41 in the cavity 4. The first part 61 of the reinforcement can be located against the first skin 2 and/or against the second skin 3. A second part 62 of the reinforcement 6 plugs the opening 5 between the first end part 21 and the second end part 31. The reinforcement 6 has a second density greater than the first density of the filling material 41. The first reinforcing part 61 is made as a single part with the second reinforcing part 62.

The functions of the reinforcement 6 are both to plug the opening 5 between the first end part 21 of the skin 2 and the second end part 31 of the skin 3 in the vane root 11, but also to provide greater bending stiffness than the filling material 41 in the vane root 11, as it is in this area that the stresses are the greatest.

Figure 9:
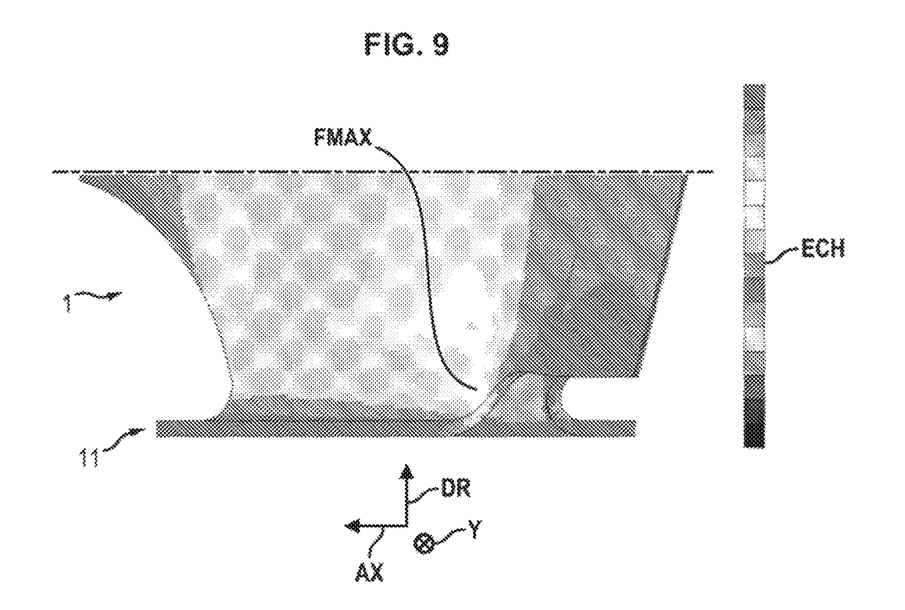
FIG. 9 shows a schematic and partial perspective view, showing in grayscale the value of the stresses exerted on a mounting side of a secondary flow guide vane of a turbomachine according to the embodiment of the invention of FIG. 2.
Figure 10:
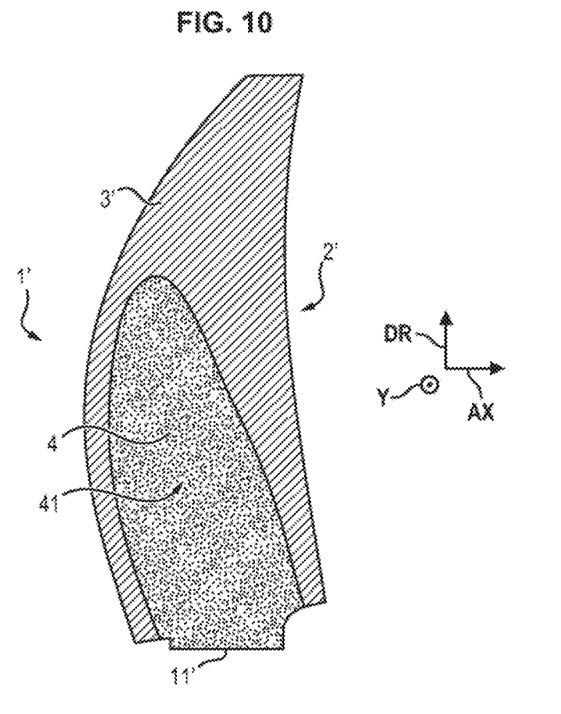
FIG. 10 shows a schematic view in radial axial section view of a comparative example of a secondary flow guide vane of a turbomachine, not equipped with the means according to the invention.
Figure 11:
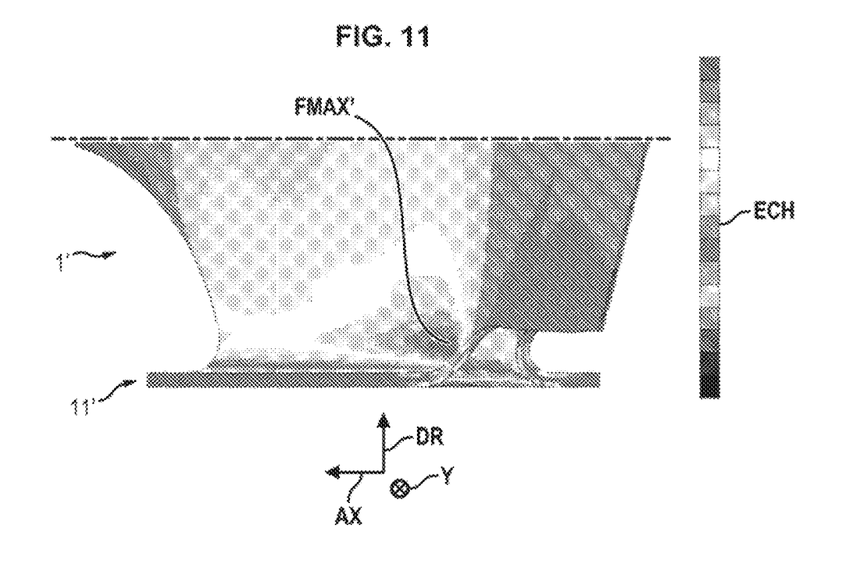
FIG. 11 shows a schematic and partial perspective view, showing in grayscale the value of the stresses exerted on a mounting side of a secondary flow guide vane of a turbomachine according to the comparative example of FIG. 10.

Thus FIG. 9 shows that the stresses exerted in operation in the root 11 of the guide vane 1 are smaller, comprising the maximum FMAX of these stresses at the connection radius, located in this vane root 11, than the stresses (comprising the maximum FMAX' of these stresses shown in FIG. 11) exerted in operation in the root 11' of a comparative example of a guide vane 1' of FIG. 10, not comprising the reinforcement 6 but only the skins 2' and 3' and the filling material 41' in the cavity 4. The invention is therefore a better compromise between stiffness and mass to improve the mechanical strength compared to the addition of a spar or compared to an increase in the thickness of the composite skins. In FIGS. 9 and 11, the stresses are shown in grayscale on the same scale ECH of increasing gray levels.

The invention makes it possible to stiffen the root area of the OGV which has the consequence of reducing the stresses in the composite skins by comparison with a solution, the cavity of which is composed solely of foam or equipped with an insert as described in the document FR-A-3 063 514. The increase in stiffness also makes it possible to limit the displacement of the tip 12 of the guide vane 1. The other benefit of the invention is the low mass impact, particularly with respect to a spar solution.

According to an embodiment of the invention, the mounting side 11 of the vane, the first end part 21 of the skin 2 and the second end part 31 of the skin 3 are located under the airflow line 7 of the vane 1 along the height direction DR. The airflow line 7 forms a limit of the turbomachine secondary flow path FS1 on the first outer skin 2 and on the second outer skin 3 and represents the points of the skins 2 and 3, which are the closest to the central axis AX of rotation of the turbomachine 100 and which are in the secondary flow FS1. The contact surface 610 has a first upstream part 611 and a second downstream part 612, which is located behind the first upstream part 611 along the width direction AX. The airflow line 7 comprises a second upstream part 71 and a second downstream part 72, which is located behind the second upstream part 71 along the width direction AX. The first upstream part 611 of the contact surface 610 is located on the side of the leading edge 8 and is located along the height direction DR above the second upstream part 71 of the airflow line 7, which is located on the side of the leading edge 8. This makes it possible to increase the stiffness of the guide vane 1, since it is in this area that the stresses are localized.

According to an embodiment of the invention, the first downstream part 612 of the contact surface 610 is located on the side of the trailing edge 9 and is located along the height direction DR below the second downstream part 72 of the airflow line 7, which is located on the trailing edge 9 side. This also makes it possible to gain guide vane 1 mass.

Figure 1:
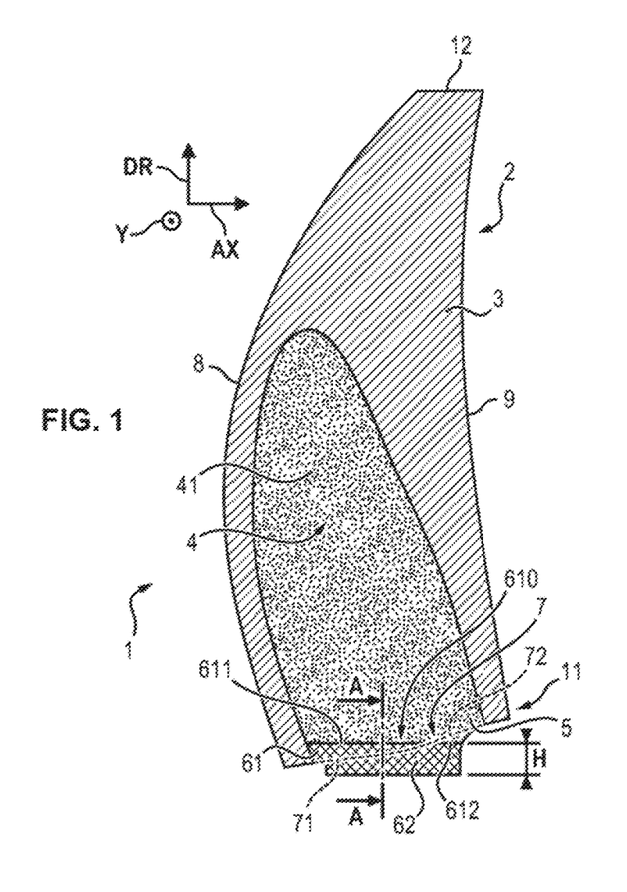
FIG. 1 shows a schematic radial axial section view of a secondary flow guide vane of a turbomachine according to an embodiment of the invention.
Figure 2:
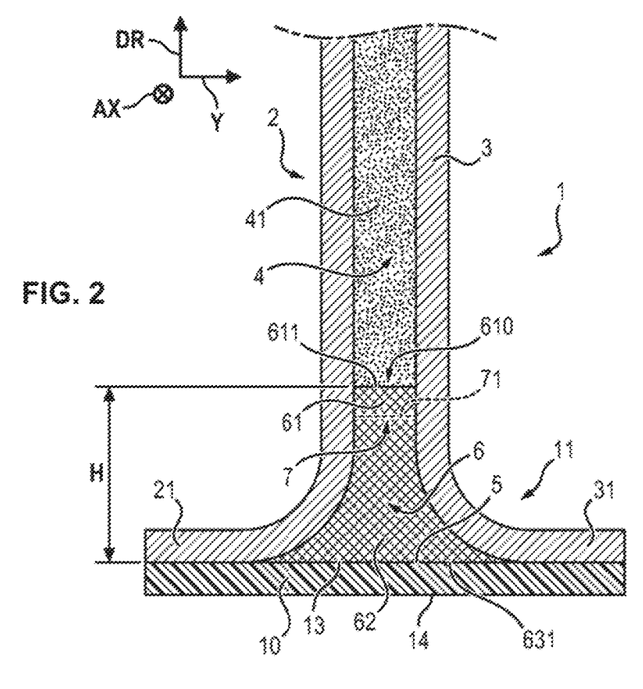
FIG. 2 shows a schematic, and partial, view in radial cross-section of a secondary flow guide vane of a turbomachine according to an embodiment of the invention, along the section line A of FIG. 1.

According to an embodiment of the invention, shown by way of example in FIG. 2, the first upstream part 611 of the contact surface 610 is located along the height direction DR at a height H greater than or equal to 50 mm and less than or equal to 100 mm above the opening 5.

According to an embodiment of the invention, the first upstream part 611 of the contact surface 610 is located along the height direction DR at a height greater than or equal to 50 mm and less than or equal to 100 mm above the second upstream part 71 of the airflow line 7.

According to an embodiment of the invention, the reinforcement 6 is made of the same first composite material as the first outer skin 2 and the second outer skin 3.

The first composite material of the skins 2 and 3 and where applicable of the reinforcement 6 may comprise a set of fibers impregnated with a matrix. The skin 2 can be monolithic and made of a single part according to a non-limiting embodiment. The skin 3 can be monolithic and made as a single part, separated from the skin 2 according to a non-limiting embodiment. The reinforcement 6 can be monolithic and made as a single part, separated from the skins 2 and 3 according to a non-limiting embodiment. The fibers may comprise at least one of the following materials: carbon, glass, aramid, polypropylene and/or ceramic. The fiber assembly may comprise woven, (two-dimensional or three-dimensional), braided, knitted or laminated fiber arrangements. The matrix typically comprises an organic material (thermosettable, thermoplastic or elastomer) or a carbon matrix. For example, the matrix comprises a plastic, typically a polymer, for example epoxy, bismaleimide or polyimide. The fiber assembly can be made by three-dimensional weaving on a Jacquard-type loom. During the weaving, bundles of warp strands (or warp strands) are disposed in several layers. The injection of plastic can be done via an injection technique of RTM or VARRTM type. The plastic injected is for example a thermosettable liquid composition containing an organic precursor of the matrix material. The organic precursor usually takes the form of a polymer, such as a resin, where applicable diluted in a solvent. In a manner known per se, the plastic is heated in such a way as to cause the polymerization of the plastic, for example by cross-linking. The fibers of the reinforcement 6 can be made of an identical or different material to the fibers of the skins 1 and 2. The skins 2 and 3 can be made as a single part while being made in the way indicated above. Preferably, the skins 2 and 3 and the reinforcement 6 are made of composite material comprising an assembly of fibers woven by three-dimensional weaving and impregnated with a matrix.

According to an embodiment of the invention, the reinforcement 6 is made of at least one metal and made as a single part. The metallic material or materials of the reinforcement 6 may comprise at least one of the following materials: steel, titanium, a titanium alloy (in particular TA6V, comprising titanium, aluminum, vanadium and traces of carbon, iron, oxygen and nitrogen), a nickel-based superalloy such as Inconel, or an aluminum alloy. The manufacturing of the metallic reinforcement 6 can involve several specific processes such as for example machining, forging, forming, casting or else additive manufacturing (three-dimensional printing).

According to an embodiment of the invention, the reinforcement 6 is made of a second non-woven composite material having fibers embedded in a matrix. These fibers can be long or short fibers.

According to an embodiment of the invention, the reinforcement 6 is made of a composite material (first or second composite material mentioned above) comprising a set of fibers impregnated with a matrix, the fibers of the reinforcement 6 being oriented in the height direction DR (or radial direction DR or span direction DR) of the guide vane 1. Thus, the reinforcement 6 material is structural in the overall radial direction with respect to the engine shaft AX, to reduce the stresses in the composite skins 1 and 2.

According to an embodiment of the invention, the reinforcement 6 has a Young modulus greater than or equal to 5 GPa, in particular greater than 10 GPa, and for example greater than or equal to 15 GPa, this Young modulus being greater than that of parts using a braid, the fibers of which are oriented overall in the cord direction AX of the vane 1 (in the width direction Y).

According to an embodiment of the invention, the filling material 41 is lighter than the first material of the skins 2 and 3. The filling material 41 can be or comprise a foam, or other materials.

Figure 5:
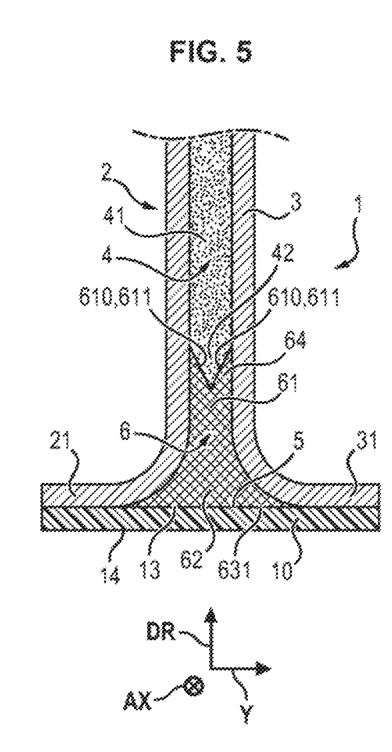
FIG. 5 shows a schematic, and partial view in radial cross-section of a secondary flow guide vane of a turbomachine according to another embodiment of the invention.
Figure 6:
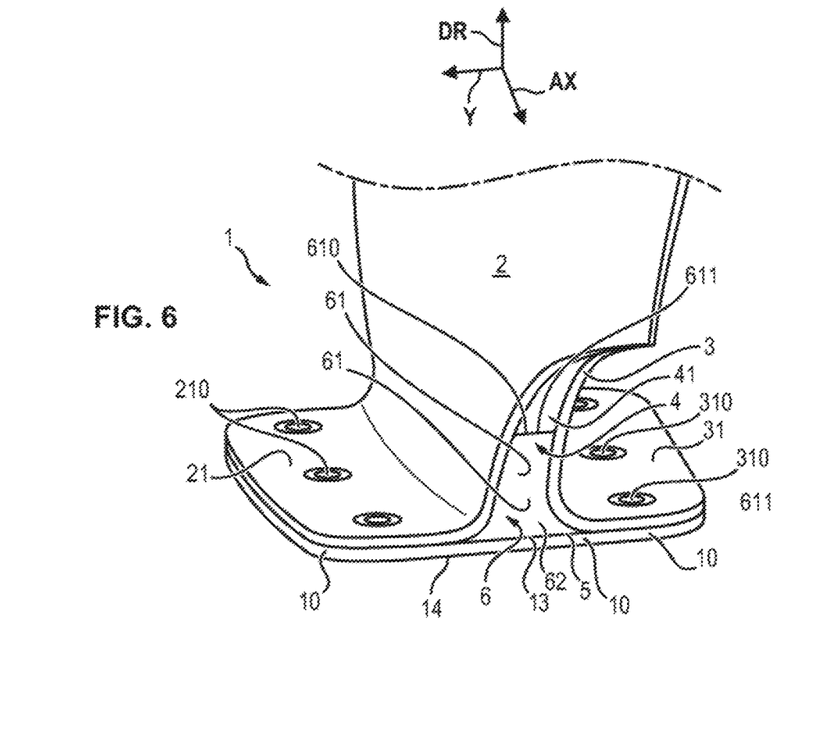
FIG. 6 shows a schematic partial view in radial cross-section and in perspective of a secondary flow guide vane of a turbomachine according to the embodiment of the invention of FIG. 2.
Figure 7:
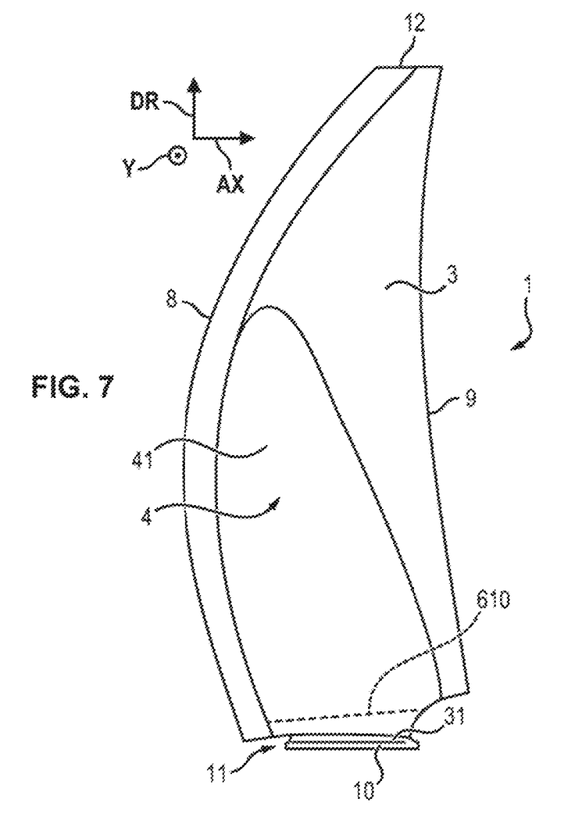
FIG. 7 shows a schematic view in axial and radial section view of a secondary flow guide vane of a turbomachine according to the embodiment of the invention of FIG. 6.
Figure 8:
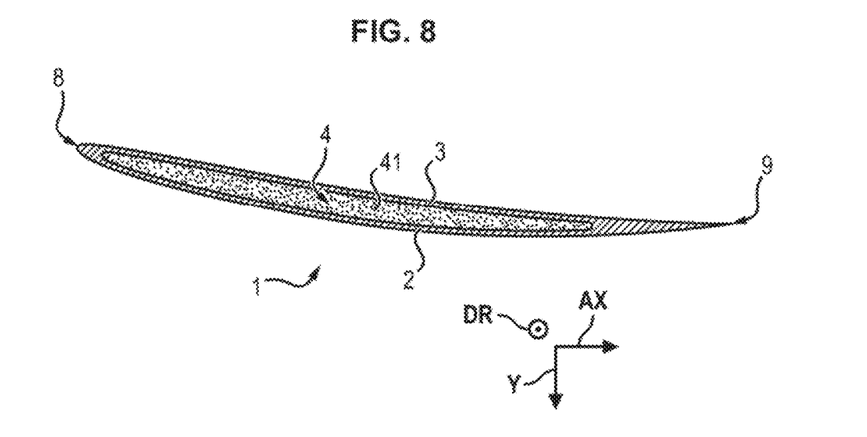
FIG. 8 shows a schematic view in top axial view of a secondary flow guide vane of a turbomachine according to the embodiments of the invention of FIGS. 1 to 7.

According to an embodiment of the invention, shown in FIGS. 2, 5 and 6, a plate 10 is attached under and against the first end part 21 and the second end part 31 and is located against the opening 5 and against the second end part 62. The plate 10 makes a link between the first end part 21 and the second end part 31.

According to an embodiment of the invention, shown in FIGS. 2, 5 and 6, the plate 10 comprises a planar upper surface 13 located under and against the first end part 21 and the second end part 31 and is located against the opening 5 and against the second reinforcing part 62.

Figure 3:
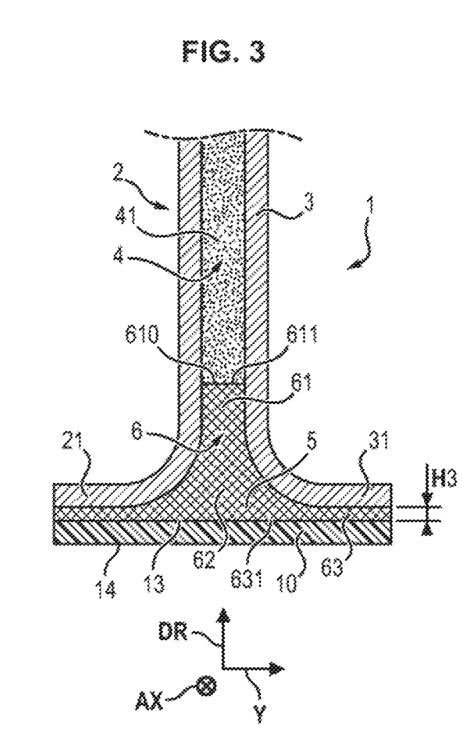
FIG. 3 shows a schematic, and partial, view in radial cross-section of a secondary flow guide vane of a turbomachine according to another embodiment of the invention.
Figure 4:
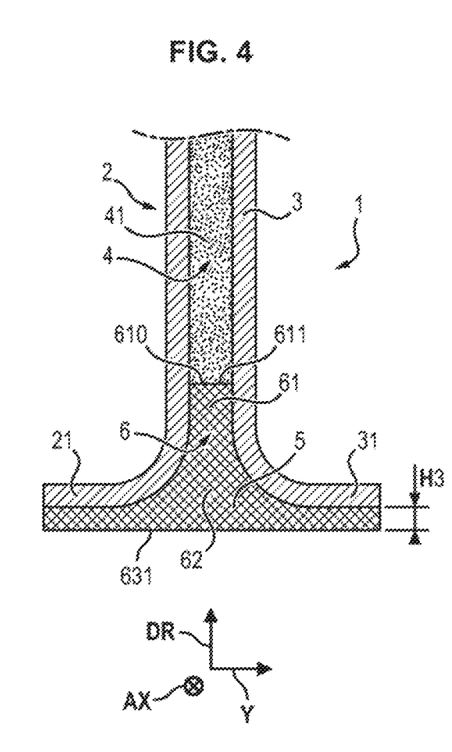
FIG. 4 shows a schematic, and partial, view in radial cross-section of a secondary flow guide vane of a turbomachine according to another embodiment of the invention.

According to an embodiment of the invention, shown in FIGS. 3 and 4, the second reinforcing part 62 extends in a base 63 of non-zero height H3 under the first end part 21, under the second end part 31 and under the opening 5. Thus the reinforcement 6 has an inverted T shape. The lower surface 631 of the base 63 can be planar.

According to an embodiment of the invention, shown in FIG. 3, a plate 10 is attached under and against the base 63. The plate 10 can comprise a planar upper surface 13 located under and against the planar lower surface 631 of the base 63.

According to an embodiment of the invention, shown in FIGS. 2, 3, 5 and 6, the plate 10 can comprise a planar lower surface 14.

According to an embodiment of the invention, shown in FIGS. 2, 3, 5 and 6, the plate 10 can be made of a material different to that of the first end part 21, of the second end part 31 and of the reinforcement 6 and forms a link between the first end part 21 and the second end part 31.

According to an embodiment of the invention, shown in FIGS. 2, 3, 5 and 6, the plate 10 is made of a composite material.

According to an embodiment of the invention, shown in FIG. 4, the base 63 of the guide vane 1 is bare on its lower surface 631. The lower surface 631 can be planar.

According to an embodiment of the invention, shown in FIG. 5, the filling material 41 comprises on the contact surface 610 a protruding part 42, which fits into a hollow part 64 of the first reinforcing part 61, the contact surface 610 being located on the protruding part 42 and on the hollow part 64. The protruding part 42 extends for example over the whole width of the cavity between the skins 1 and 2 along the direction Y. The hollow part 64 extends for example over the whole width of the cavity between the skins 1 and 2 along the direction Y. This makes it possible to make a gradual transition between the filling material 41 and the reinforcement 6. This makes it possible to attenuate a jump in stiffness between the filling material 41 and the reinforcement 6 and avoids generating concentrations of local stresses in the composite skins 2 and 3.

The attaching side 11, the first end part 21 and the second end part 31 may be used to mount or attach the guide vane 1 against the outer surface 103 of the upstream part 103 of the casing 101 of the turbomachine 100 by mounting or attaching means, which can for example comprise holes through the first end part 21 and the second end part 31, as shown by the through holes 210 and 310 in the height direction DR in FIG. 6, and which can comprise bolting or riveting in the holes, or other means.

Of course, the embodiments, features, possibilities and examples described above may be combined with one another or be selected independently of one another.

The invention claimed is:

1. A secondary flow guide vane of a turbomachine, comprising a first outer skin and a second outer skin, which are made of a first composite material and which are connected to one another,
    the first outer skin comprising a first end part, the second outer skin comprising a second end part distant from the first end part,
    the first end part and the second end part being located on the same mounting side of the vane, delimiting between them an opening and branching away from one another along a thickness direction,
    wherein
    the vane further comprises:
    a cavity, which is located along the thickness direction between the first outer skin and the second outer skin and which opens into the opening,
    a filling material which has a first density and which is located in the cavity and at a non-zero distance from the opening,
    a reinforcement, which has a second density greater than the first density and which comprises a first reinforcing part located in the cavity and against the filling material and a second reinforcing part, which closes the opening between the first end part and the second end part,
    the first reinforcing part forming a single piece with the second reinforcing part.

2. The guide vane as claimed in claim 1, wherein the first reinforcing part comprises a contact surface for contact with the filling material in the cavity,
    the first outer skin and the second outer skin having a leading edge and a trailing edge, distant from one another along a width direction of the vane, which is transverse with respect to the thickness direction,
    the mounting side of the vane being located under an airflow line along a height direction of the vane, transverse with respect to the thickness direction and with respect to the width direction,
    the airflow line forming a limit of the secondary flow of the turbomachine on the first outer skin and on the second outer skin,
    a first upstream part of the contact surface, which is located on the side of the leading edge, is located along the height direction above a second upstream part of the airflow line, which is located on the side of the leading edge.

3. The guide vane as claimed in claim 2, wherein a first downstream part of the contact surface, which is located on the side of the trailing edge, is located along the height direction below a second downstream part of the airflow line, which is located on the side of the trailing edge.

4. The guide vane as claimed in claim 2, wherein the first upstream part of the contact surface is located along the height direction at a height greater than or equal to 50 mm and less than or equal to 100 mm above the opening.

5. The guide vane as claimed in claim 2, wherein the first upstream part of the contact surface is located along the height direction at a height greater than or equal to 50 mm and less than or equal to 100 mm above the second upstream part of the airflow line.

6. The guide vane as claimed in claim 1, wherein a plate makes a connection between the first end part and the second end part, is attached under and against the first end part and the second end part and is located against the opening and against the second reinforcing part.

7. The guide vane as claimed in claim 1, wherein the second reinforcing part extends as a base of non-zero height under the first end part, under the second end part and under the opening.

8. The guide vane as claimed in claim 7, wherein a plate is attached under and against the base.

9. The guide vane as claimed in claim 6, wherein the plate is made of a composite material.

10. The guide vane as claimed in claim 1, wherein the reinforcement is made of the first composite material.

11. The guide vane as claimed in claim 1, wherein the reinforcement is made of a second non-woven composite material with fibers embedded in a matrix.

12. The guide vane as claimed in claim 1, wherein the reinforcement is made of at least one metal.

13. The guide vane as claimed in claim 1, wherein the reinforcement has a Young modulus greater than or equal to 5 GPa.

14. The guide vane as claimed in claim 2, wherein the filling material comprises at the contact surface a protruding part, which fits into a hollow part of the first reinforcing part.

15. A aeronautical turbomachine with no fairing, comprising:
   a casing,
   a fan having a fan hub and peripheral fan blades, secured to the fan hub,
   the fan hub having a downstream hub part, which is surrounded by an inner surface of an upstream part of the casing and which protrudes from the upstream part of the casing,
   the fan hub being mounted rotatably with respect to the upstream part of the casing about an axis of rotation, directed from upstream to downstream,
the turbomachine further comprising secondary flow guide vanes as claimed in claim 1, which are located, by their mounting side, adjacent to an outer wall of the upstream part of the casing and are located downstream with respect to the peripheral fan blades.

* * * * *